United States Patent
Hu (12) 
(10) Patent No.: US 6,292,454 B1
(45) Date of Patent: Sep. 18, 2001

(54) APPARATUS AND METHOD FOR IMPLEMENTING A VARIABLE-SPEED AUDIO DATA PLAYBACK SYSTEM

(75) Inventor: Fengduo Hu, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/168,499

(22) Filed: Oct. 8, 1998

(51) Int. Cl.[7] .................................................. G11B 7/00
(52) U.S. Cl. ................................. 369/124.08; 369/47.32
(58) Field of Search .................................. 369/59, 124.01, 369/124.07, 124.08, 124.09, 47.15, 47.17, 47.16, 47.28, 47.32, 59.1, 47.2; 360/27, 29

(56) References Cited

U.S. PATENT DOCUMENTS

| | | | |
|---|---|---|---|
| 5,341,432 | * 8/1994 | Suzuki et al. | 381/34 |
| 5,543,927 | 8/1996 | Herz | 358/312 |
| 5,671,318 | 9/1997 | Herz | 386/68 |

FOREIGN PATENT DOCUMENTS

| | | | |
|---|---|---|---|
| 0371717 | * 6/1990 | (EP) | H04N/5/93 |
| 0525544 | * 2/1993 | (EP) | G10L/9/18 |
| 09073299 | * 3/1997 | (EP) | G10L/5/783 |
| 2320791 | * 7/1998 | (GB) | G10L/3/02 |
| 9825405 | * 6/1998 | (WO) | H04N/5/783 |

OTHER PUBLICATIONS

Salim Roucos and Alexander M. Wilgus, "High Quality Time–Scale Modification for Speech", Aug. 1985.

* cited by examiner

Primary Examiner—Paul W. Huber
(74) Attorney, Agent, or Firm—Gregory J. Koerner; Simon & Koerner LLP (57) ABSTRACT

An apparatus and method for implementing a variable-speed audio data playback system comprises a processor that truncates audio data into frames and then performs a series of synchronized crossfades to discard excess audio data that is unneccessary during variable-speed playback. During the synchronized crossfade, the processor stores a source frame and a destination frame into memory. The processor then locates a maximum crosscorrelation point between the source frame and the destination frame and performs a synchronized crossfade that starts at the maximum crosscorrelation point to thereby produce high-quality reproduced sound to a system user during a variable-speed playback mode.

38 Claims, 7 Drawing Sheets

APPARATUS AND METHOD FOR IMPLEMENTING A VARIABLE-SPEED AUDIO DATA PLAYBACK SYSTEM

BACKGROUND OF THE INVENTION

1. Field of the Invention

This invention relates generally to data reproduction systems, and relates more particularly to an apparatus and method for implementing a variable-speed audio data playback system.

2. Description of the Background Art

Implementing an effective and efficient method for the playback of audio data is a significant consideration of designers, manufacturers, and users of contemporary audio systems. Modem audio playback systems are typically required to accurately reproduce various types of audio data. For example, a digital video-disc device may be utilized to reproduce recordings of motion picture soundtracks that include various combinations of voice, music and background sounds. Current advances in digital audio technology have further increased the importance of preserving high sound quality in any audio playback system.

One special playback technique that may be advantageously used in many audio devices is a variable-speed playback function. For example, a system user may wish to use a program search mode to rapidly shuttle forward at double the normal playback speed in order to quickly locate a particular remote point in the recorded program. To facilitate locating the desired point in the recorded program, the system user typically aurally monitors the audio playback during variable-speed playback mode. The playback sound quality that is available during the variable-speed playback mode is therefore a significant performance factor that can enhance the efficiency and user-friendliness of such an audio reproduction system.

Some audio reproduction systems include variable-speed playback modes that simply provide the audio data to the listener at a higher rate of speed. For example, if such a system featured a double-speed playback mode, then the reproduced audio program would be played back at twice the originally-recorded speed, and the pitch of the audio program would be similarly doubled. This rapid playback speed and the corresponding distorted audio program result in substantially decreased performance for the system user.

Other audio reproduction systems feature variable-speed playback modes that produce the audio program with various types of sound artifacts. For example, some of the sound artifacts present in selected variable-speed audio devices include clicking-type sounds and warbling sound distortion. In spite of the difficulties encountered, variable-speed playback functionality remains a beneficial and important feature for enhanced operation of contemporary audio playback systems. Therefore, for all the foregoing reasons, an improved method is needed for implementing a variable-speed audio data playback system.

SUMMARY OF THE INVENTION

In accordance with the present invention, an apparatus and method are disclosed for implementing a variable-speed audio data playback system. In the variable-speed mode of one embodiment of the present invention, a post-processor initially stores the first two frames (frame 1 and frame 2) of audio data into a first buffer. Then, the post-processor stores the next two frames (frame 3 and frame 4) of audio data into a second buffer 2.

Next, the post-processor analyzes the audio data and locates a maximum crosscorrelation lag "L" between a source frame (initially, frame 2) and a destination frame (initially, frame 3). The maximum crosscorrelation lag "L" represents the point of maximum similarity between the source frame and the destination frame. The processor then performs a synchronized crossfading procedure between the source frame and the destination frame starting at the previously-determined maximum crosscorrelation lag "L". The post-processor preferably performs the synchronized crossfading procedure by decreasing the amplitude of the source frame while simultaneously increasing the amplitude of the destination frame.

Then, the post-processor discards any unnecessary audio data, and outputs those frames that have just completed the synchronized crossfading procedure to a playback system for reproduction. Next, the post-processor determines whether any unprocessed (uncrossfaded) frames of audio data remain for the variable-speed playback mode. If unprocessed frames of audio data remain for the variable-speed playback mode, then the post-processor repeatedly returns and performs another synchronized crossfade on the next two frames of audio data until the variable-speed mode is terminated or all audio data has been processed. The present invention thus efficiently and effectively removes unneccessary audio data to implement a variable-speed audio data playback system and thereby provide high-quality sound reproduction to a system user.

DETAILED DESCRIPTION OF THE PREFERRED EMBODIMENT

The present invention relates to an improvement in data processing systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises an apparatus and method for implementing a variable-speed audio data playback system and includes a processor that truncates audio data into frames and then performs a series of synchronized crossfades to discard excess audio data that is unnecesary during variable-speed playback. During the synchronized crossfade, the processor stores a source frame and a destination frame into memory. The processor then locates a maximum crosscorrelation point between the source frame and the destination frame, and performs a synchronized crossfade that starts at the maximum crosscorrelation point to thereby provide high-quality reproduced sound to a system user during a variable-speed playback mode.

Figure 1:
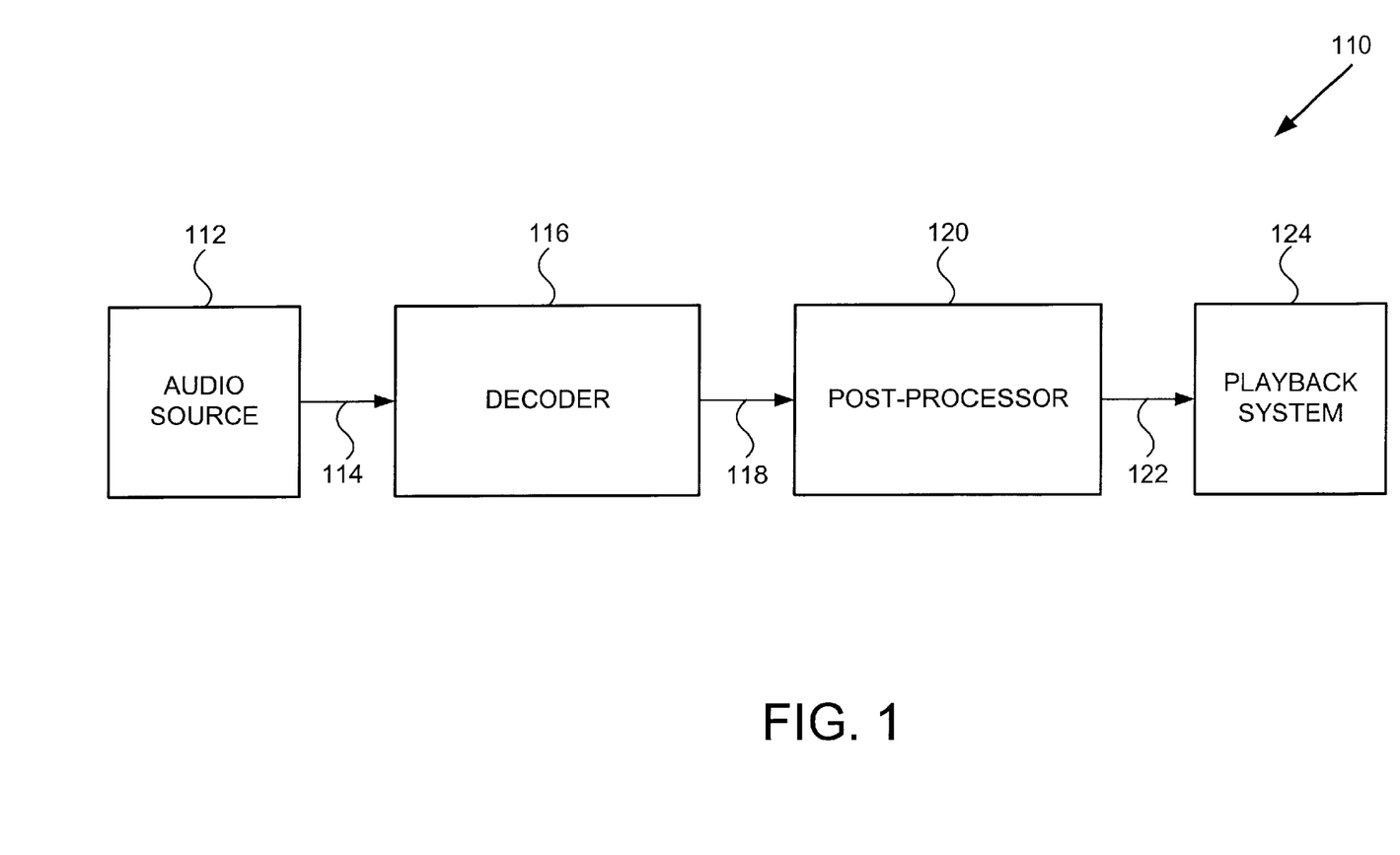
FIG. 1 is a block diagram of one embodiment for an audio data processing system, in accordance with the present invention.

Referring now to FIG. 1, a block diagram of one embodiment for an audio data processing system 110 is shown, in accordance with the present invention. The FIG. 1 embodiment of system 110 preferably includes an audio source 112, a decoder 116, a post-processor 120, and a playback system 124. In other embodiments of the present invention, system 110 may alternately be implemented using various other suitable configurations and components.

In normal operation, audio source 112 initially provides source audio data to decoder 116 via path 114. In accordance with the present invention, audio source 112 may variously include a digital video-disc device, a compact disc player, or any other appropriate and compatible data source. In the FIG. 1 embodiment, the source audio data generated by audio source 112 is preferably binary digital data encoded in a linear pulse code modulation (LPCM) format. However, in alternate embodiments, the source audio data generated by audio source 112 may readily be any other appropriate and compatible type of data format.

Decoder 116 the responsively performs a decoding process on the received source audio data to generate decoded audio data to post-processor 120 via path 118. Post-processor 120 next performs selected processing functions upon the decoded audio data and responsively generates processed audio data to playback system 124 via path 122. Finally, playback system 124 reproduces the processed audio data for use by a listener of system 110.

Figure 2:
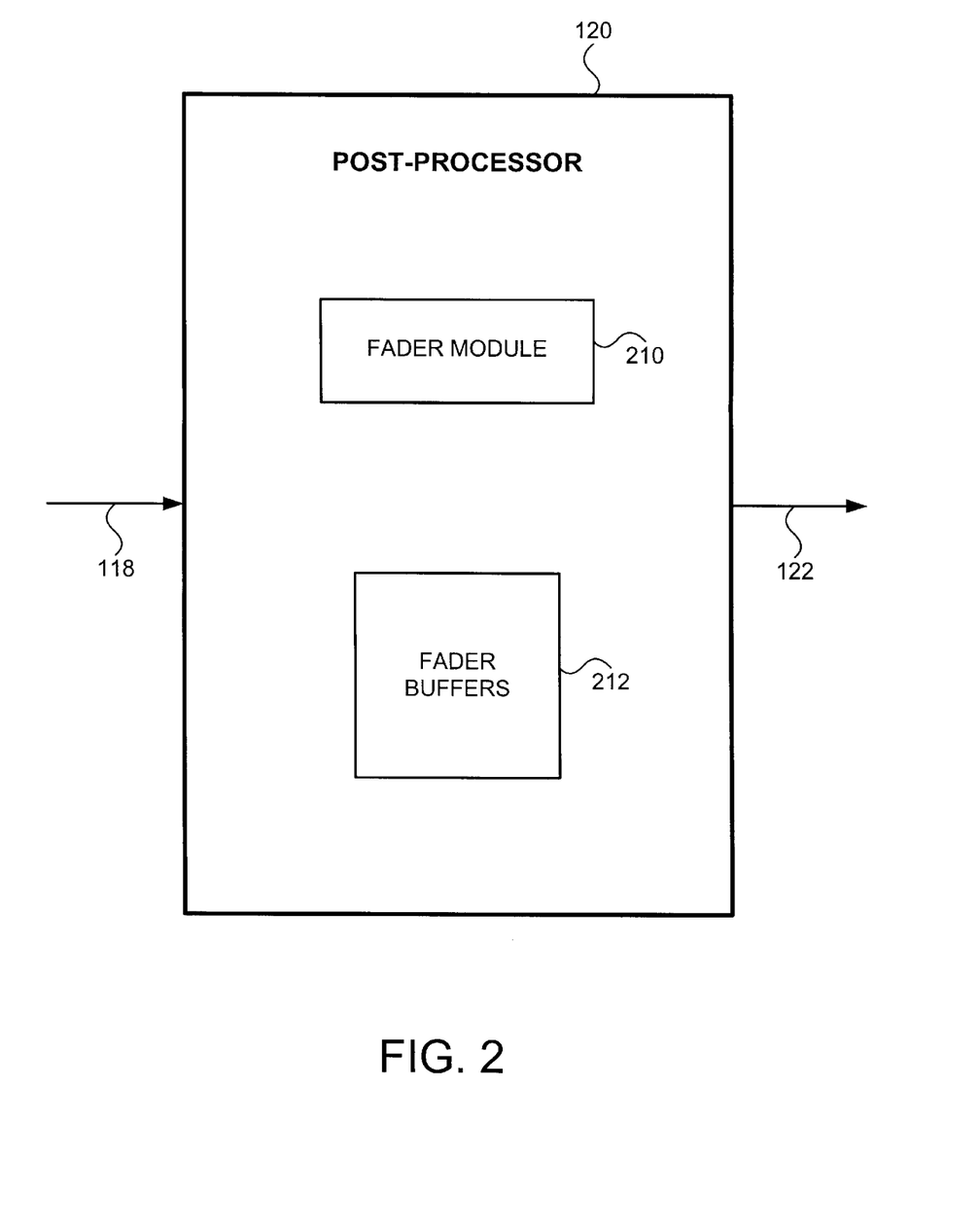
FIG. 2 is a block diagram of one embodiment for the post-processor of FIG. 1, in accordance with the present invention.

Referring now to FIG. 2, a block diagram of one embodiment for the FIG. 1 post-processor 120 is shown, in accordance with the present invention. In the FIG. 2 embodiment, post-processor 120 includes, but is not limited to, a fader module 210 and fader buffers 212. As discussed above in conjunction with FIG. 1, the FIG. 2 embodiment of post-processor 120 preferably receives decoded audio data from decoder 116 via path 118, and responsively generates processed audio data to playback system 124 via path 122.

In the FIG. 2 embodiment, fader module 210 includes software program instructions that may be advantageously executed by post-processor 120 to control and coordinate variable-speed playback of audio data, in accordance with the present invention. In alternate embodiments of the present invention, fader module 210 may be implemented using various appropriate and compatible hardware configurations. The operation and functionality of fader module 210 are further discussed below in conjunction with FIGS. 4 through 7.

Figure 3:
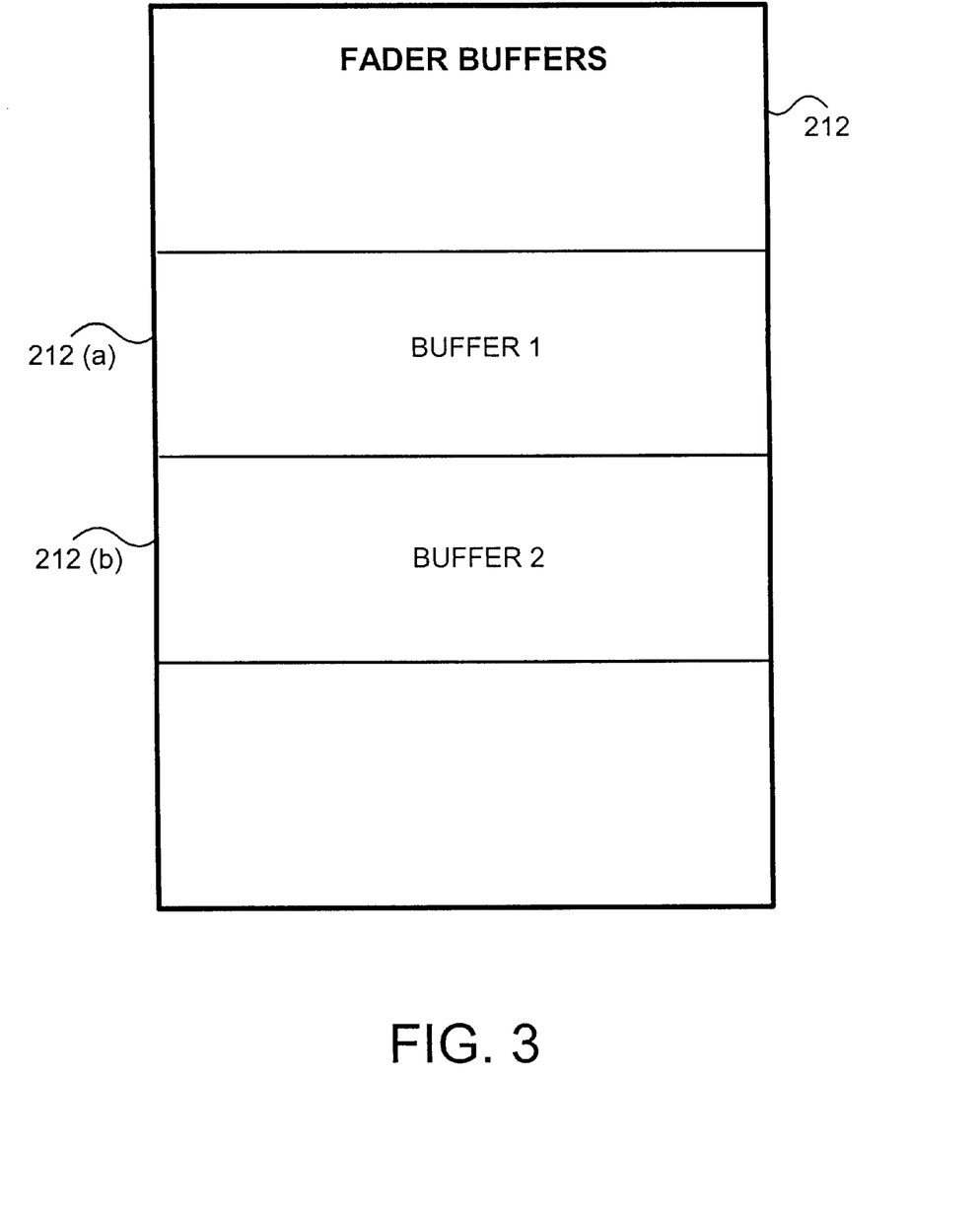
FIG. 3 is a block diagram of one embodiment for the fader buffers of FIG. 2, in accordance with the present invention.

Referring now to FIG. 3, a block diagram of one embodiment for the FIG. 2 fader buffers 212 is shown, in accordance with the present invention. In the FIG. 3 embodiment, fader buffers 212 preferably include a buffer 1 (212)a)) and a buffer 2 (212(b)). In alternate embodiments of the present invention, fader buffers 212 may readily be implemented using different configurations and numbers of buffers. The utilization and functionality of fader buffers 212 are further discussed below in conjunction with FIGS. 5 through 7.

Figure 4:
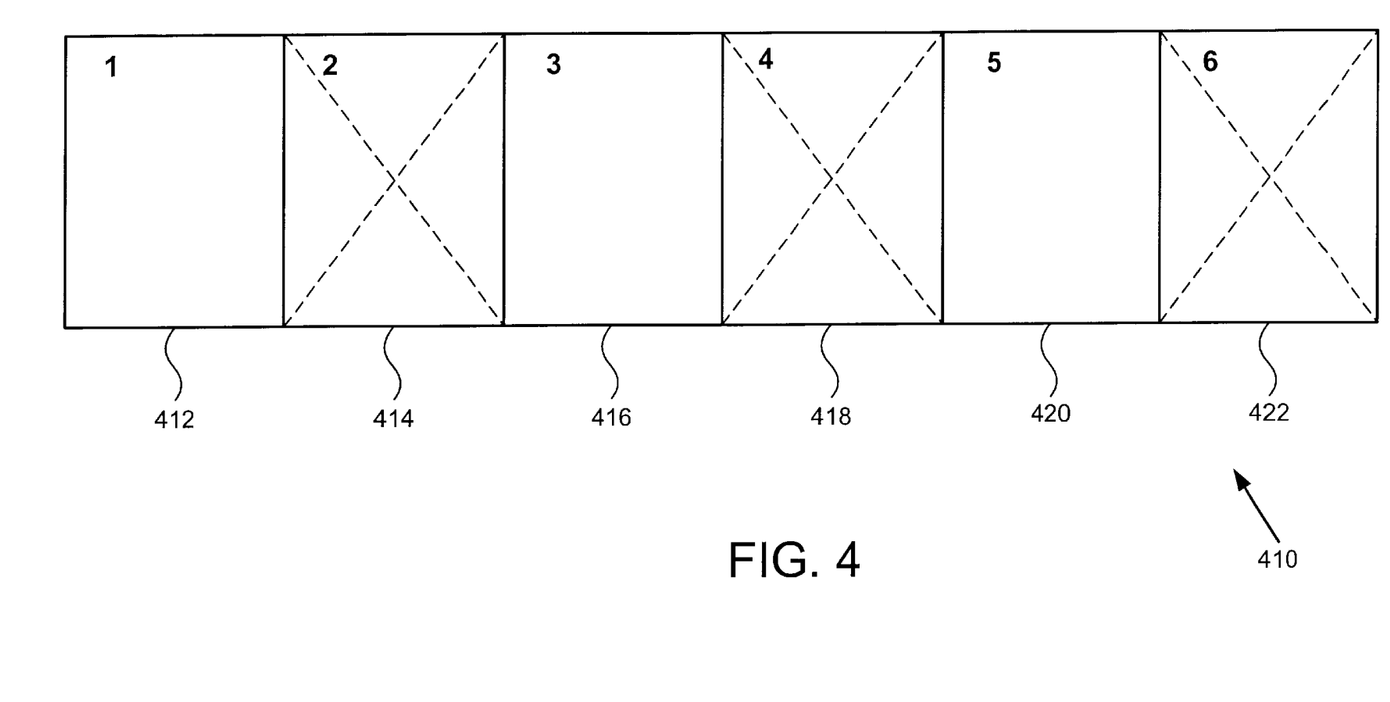
FIG. 4 is a diagram of one embodiment for variable-speed playback of audio data, in accordance with the present invention.

Referring now to FIG. 4, a diagram of one embodiment for variable-speed playback of audio data is shown, in accordance with the present invention. In the FIG. 4 embodiment, post-processor 120 preferably truncates audio data 410 into discrete frames 1 (412) through 6 (422) and stores the frames of audio data into fader buffers 212. Frames 1 (412) through 6 (422) of FIG. 4 are presented to illustrate principles of the present invention. However, in actual operation, audio data 410 typically includes a substantial number of additional frames that continue in sequence following frame 6 (422).

In the preferred embodiment of the present invention, the source audio data provided by audio source 112 is comprised of data samples preferably having a constant sample rate of 48 KHz. To successfully playback audio data 410 at an increased speed, post-processor 120 must therefore discard some portions of audio data 410 without creating noticeable sound artifacts or objectionable discontinuities. In the embodiments shown in FIGS. 4 through 6, the present invention is discussed in the context of a double-speed playback system. In alternate embodiments, however, the present invention may readily be utilized to implement audio systems that include variable-speed playback modes with playback ratios other than a 2-to-1 ratio.

In the double-speed embodiment of FIG. 4, post-processor 120 preferably discards all the even-numbered frames (frame 2 (414), frame 4 (418), and frame 6 (422)). Post-processor 129 then outputs all the odd numbered frames (frame 1 (412), frame 3 (416), and frame 5 (420)) to playback system 124 for reproduction. Similarly, a playback system with a variable-speed playback ratio of 4-to-3 may be implemented by discarding every fourth frame, instead of every other frame.

The FIG. 4 embodiment is relatively easy to implement, however, certain objectionable clicking-type sound artifacts may be detected by a listener during variable-speed mode. These sound artifacts are typically caused by the discontinuities created between newly-adjacent frame 1 (412) and frame 3 (416), or between newly-adjacent frame 3 (16) and frame 5 (420)).

Figure 5:
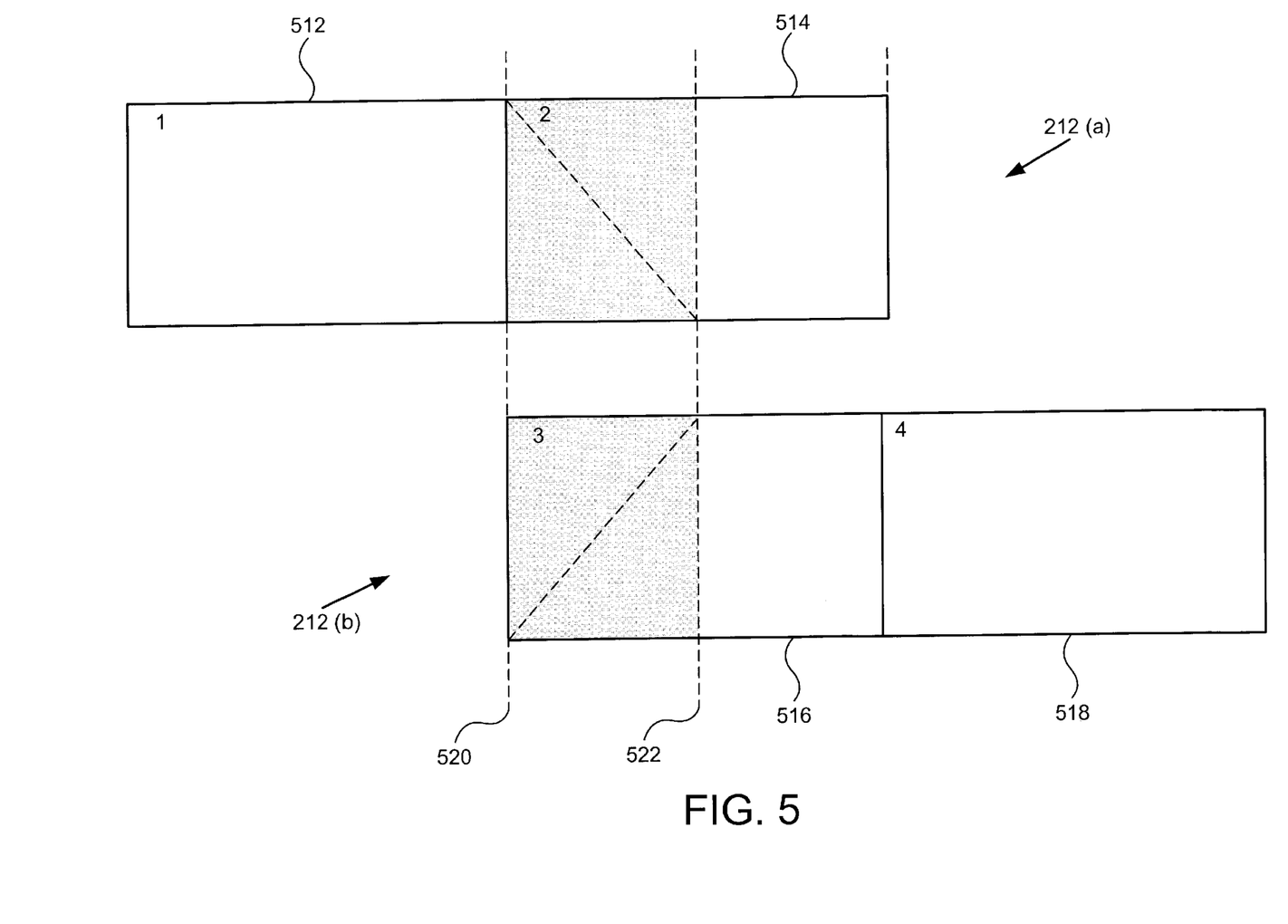
FIG. 5 is a diagram of one embodiment for a cross-fading process, in accordance with the present invention.

Referring now to FIG. 5, a diagram of one embodiment for a cross-fading process is shown, in accordance with the present invention. Cross-fading is a signal mixing technique whereby the amplitude of a source signal is decreased, while the amplitude of a destination signal is simultaneously increased, to provide an output signal that exhibits a smooth transition from the source signal to the destination signal. Post-processor 120 advantageously utilizes the cross-fading techniques discussed below in conjunction with FIGS. 5 and 6 to effectively avoid the objectionable clicking-type sound artifacts inherent in the FIG. 4 embodiment discussed above.

In the FIG. 5 embodiment, instead of simply discarding frame 2 (514) (as in the FIG. 4 embodiment), post-processor 120 crossfades the first half of frame 2 (514) into the first half of frame 3 (516), as shown in FIG. 5 between time 520 and time 522. In practice, post-processor 120 initially stores frame 1 (512) and frame 2 (514) into buffer 1 (212(a)), and also stores frame 3 (516) and frame 4 (518) into buffer 2 (212(b)) of fader buffers 212 (FIG. 3).

Then, between time 520 and time 522, post-processor 120 decreases the amplitude of frame 2 (514) while simultaneously increasing the amplitude of frame 3 (522) to achieve a smooth crossfade between frame 2 (514) and frame 3 (522). Post-processor 120 may then discard the second half of source frame 2 (514), and output the processed frames of audio data (frame 1 (512), crossfaded first halves of source frame 2 (514) and destination frame 3 516), and the second half of destination frame 3 (516)) to playback system 124 for reproduction.

Post-processor 120 continues to load additional frames of audio data into fader buffers 212 and perform the foregoing crossfading technique. For example, once the crossfade between frame 2 (514) and frame 3 (516) is complete, post-processor 120 may then load new frames 5 and 6 (not shown) into buffer 1 (212(a)) to perform a similar crossfading procedure between a new source frame 4 (518) and a new destination frame 5 (not shown).

The FIG. 5 embodiment provides improved performance with regard to the clicking-type sound artifacts discussed above in conjunction with FIG. 4. However, due to the differences and variations between adjacent frames used in the FIG. 5 crossfading technique, the FIG. 5 embodiment may exhibit certain warbling-type sound artifacts when the resultant audio data is reproduced by playback system 124.

Figure 6:
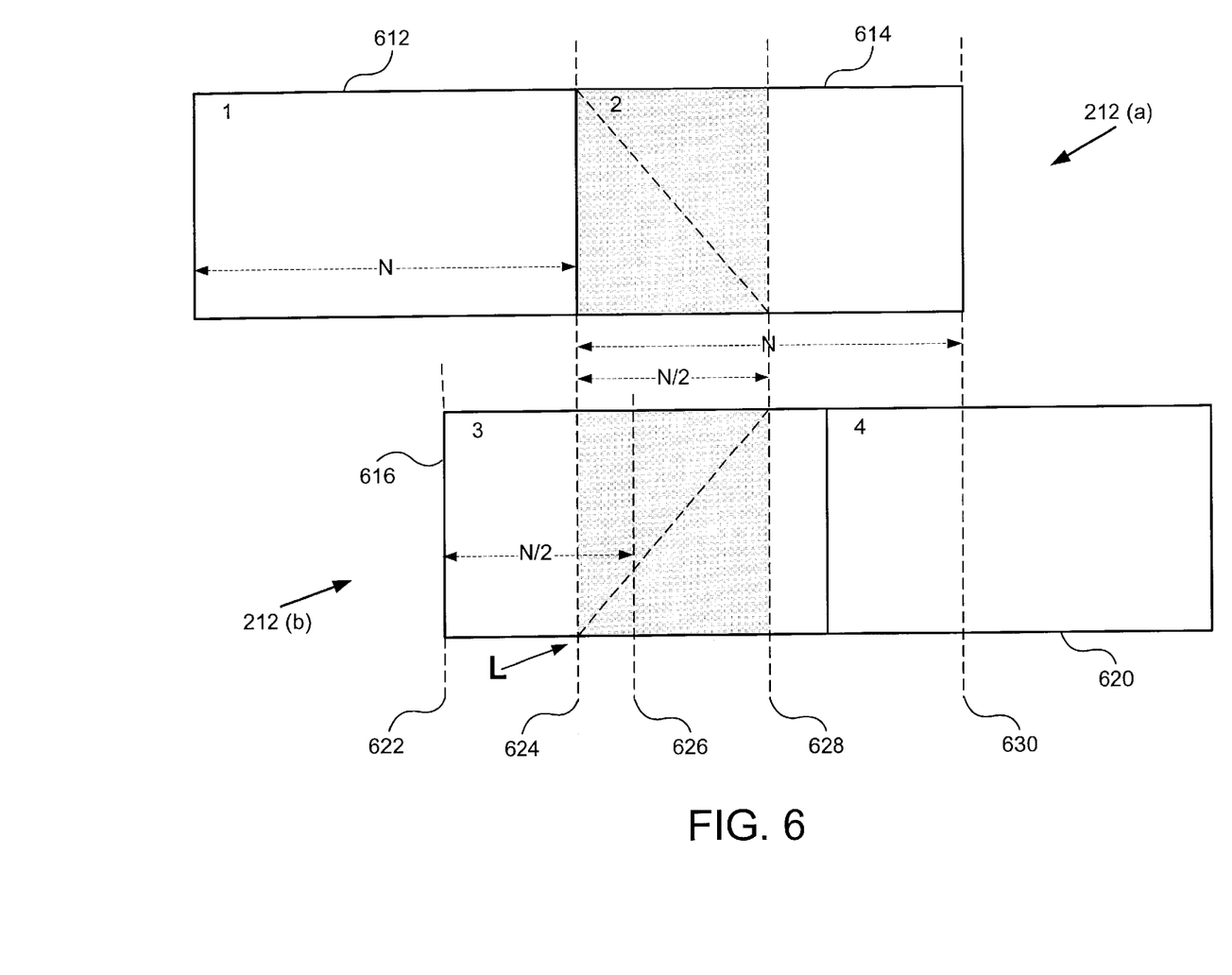
FIG. 6 is a diagram of a preferred embodiment for a synchronized cross-fading process, in accordance with the present invention.

Referring now to FIG. 6, a diagram of a preferred embodiment for a synchronized cross-fading process is shown, in accordance with the present invention. In order to avoid the warbling-type sound artifacts of the FIG. 5 embodiment, the preferred embodiment of FIG. 6 essentially begins a synchronized crossfading procedure at a point of maximum crosscorrelation or similarity between the two adjacent frames that are being crossfaded by post-processor 120.

In the FIG. 6 embodiment, post-processor 120 initially loads frame 1 (612) and frame 2 (614) into buffer 1 (212(a)) of fader buffers 212 (FIG. 3). Post-processor 120 also loads frame 3 (616) and frame 4 (620) into buffer 2 (212(b)) of fader buffers 212. Each FIG. 6 frame has a length "N" which may be selected to achieve optimal sound quality during variable-speed playback mode. In the preferred embodiment, the optimal frame length "N" typically falls within the range of 30 to 50 milliseconds.

To perform the FIG. 6 synchronized crossfading technique, post-processor 120 preferably analyzes the first half (N/2) of frame 3 (616) (destination frame) between time 622 and time 626 to determine crosscorrelation values "$R_{xy}(\tau)$" between frame 3 (616) and the starting point of frame 2 (614) (source frame) at time 624. The crosscorrelation values "$R_{xy}(\tau)$" may be expressed by the following formula:

$$R_{xy}(\tau) = \Sigma x(k)^* y(k+\tau) \tau = 0, \ldots, N/2-1$$

where x(k) is the start of the synchronized crossfade in the source frame (frame 2 (614)), y(k) is the start of the destination frame (frame 3 (616)), N/2 is one-half the frame duration, and $\tau$ is a distance from the start of the destination frame (frame 3 (616)).

Post-processor 120 then locates the maximum crosscorrelation lag "L" within the first half (N/2) of frame 3 (616) between time 622 and time 626. The maximum crosscorrelation point "L" may be expressed by the following formula:

$$R_{xy}(L) = \text{Max}[R_{xy}(\tau)] \tau = 0, \ldots, N/2-1$$

In the FIG. 6 embodiment, the maximum crosscorrelation point "L" is shown at time 624. In other embodiments, the maximum crosscorrelation point "L" may similarly be located anywhere within the first half of the destination frame (frame 3 (616)). The maximum crosscorrelation point "L" therefore represents the point of maximum similarity between the source frame and the destination frame for purposes of the synchronized crossfade. Although post-processor 120 preferably uses frame signal amplitude as the primary criterion for determining maximum crosscorrelation point "L", in alternate embodiments, post-processor 120 may similarly utilize various other criteria to determine frame similarity or maximum crosscorrelation. Furthermore, in alternate embodiments, post-processor 120 may determine multiple relevant points of crosscorrelation, and may analyze various different portions of the source frame and destination frame to determine the points of crosscorrelation.

In the FIG. 6 example, once maximum crosscorrelation point "L" is determined, then post-processor 120 performs the synchronized crossfading technique by decreasing the amplitude of source frame 2 (614) and simultaneously increasing the amplitude of destination frame 3 (616) between time 624 and time 628 (a distance of N/2). Post-processor 120 preferably completes the second half of the destination frame between time 628 and time 630 by using a portion of frame 4 (620), as shown in FIG. 6. After the foregoing synchronized crossfade, the destination frame in the FIG. 6 example therefore extends a distance "N" from maximum crosscorrelation point "L" at time 624 until time 630 within frame 4 (620).

After the initial synchronized crossfade between frame 2 (614) and frame 3 (616) is complete, then post-processor 120 may discard any unneccessary audio data, and output the processed audio data to playback system 124 for reproduction. For example, in the FIG. 6 embodiment, post-processor 120 preferably discards the second half of source frame 2 (614) between times 628 and 630, and also discards a portion of destination frame 3 (616) between time 622 and time 624. In the FIG. 6 example, post-processor 120 preferably outputs frame 1 (612) and the new crossfaded destination frame that lies between time 624 and time 630 and is comprised of audio data from frame 2 (614), frame 3 (616), and frame 4 (620).

Post-processor 120 next preferably loads new frames 5 and 6 (not shown) into buffer 1 (212(a)) to replace the previously-processed frame 1 (612) and frame 2 (614). Post-processor 120 then preferably repeats the foregoing synchronized crossfading procedure using frame 4 (620) as the new source frame and frame 5 (not shown) as the new destination frame. The present invention thus continues to repeatedly perform a series of synchronized crossfades as long as post-processor 120 remains in variable-speed playback mode.

After the initial FIG. 6 synchronized crossfade described above is completed, a portion of frame 4 (620) ending at time 630 has already been used to form the second half of the initial destination frame shown in FIG. 6. Subsequently, when frame 4 (620) becomes the new source frame for the next synchronized crossfade, then time 630 in frame 4 (620) becomes the delayed source frame starting point for that next synchronized crossfade. In other words, the next synchronized crossfade between frame 4 (620) and frame 5 (not shown) will begin in frame 4 (620) at the delayed source frame starting point shown in FIG. 6 at time 630. Each subsequent crossfade will likewise utilize a similar delayed source frame starting point using the techniques discussed above.

Figure 7:
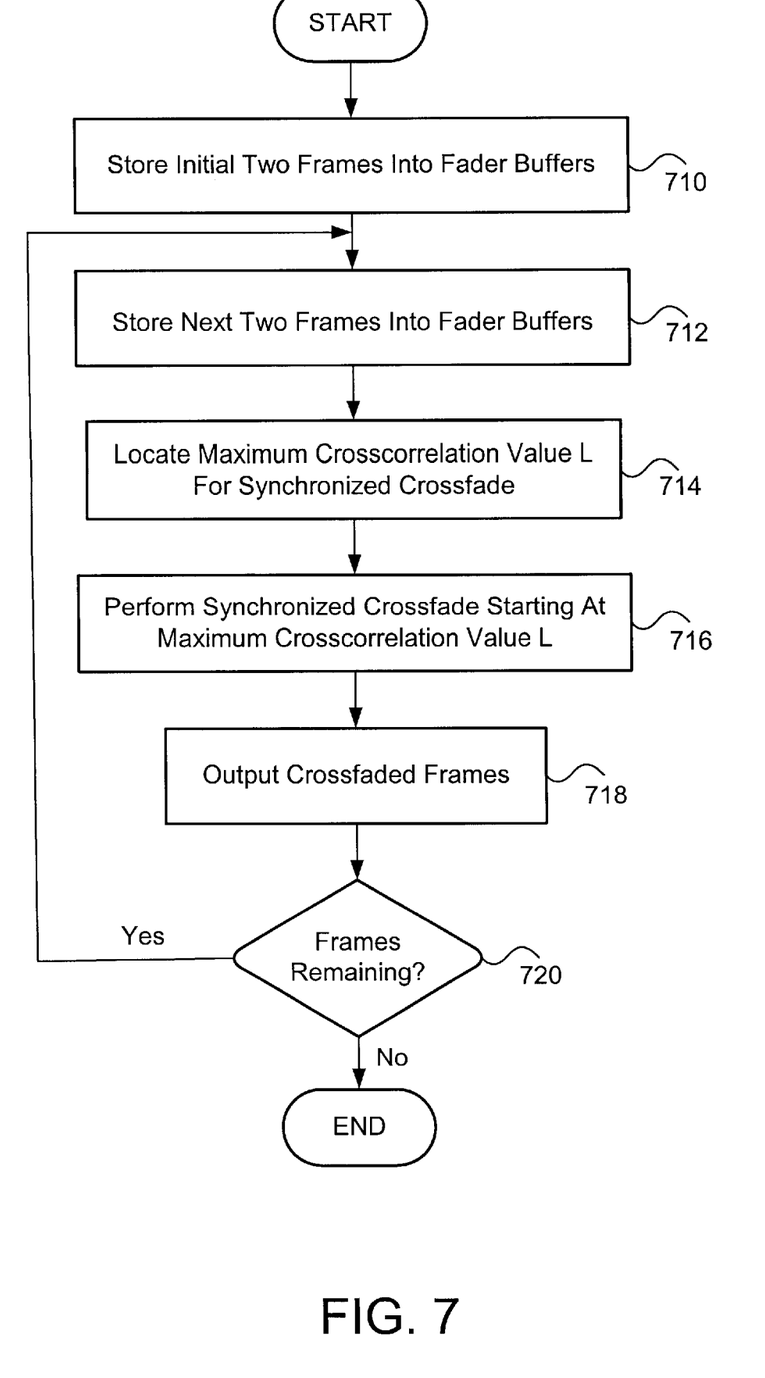
FIG. 7 is a flowchart of method steps for one embodiment of variable-speed playback of audio data, in accordance with the present invention.

Referring now to FIG. 7, a flowchart of method steps for one embodiment of variable-speed audio playback is shown, in accordance with the present invention. In the FIG. 7 embodiment, in step 710, post-processor 120 initially stores the first two frames (frame 1 (612) and frame 2 (614)) of audio data into buffer 1 (212(a)) of fader buffers 212. Then, is step 712, post-processor 120 stores the next two frames (initially, frame 3 (616) and frame 4 (620)) of audio data into buffer 2 (212(b)) of fader buffers 212.

Next, in step 714, post-processor 120 locates the maximum crosscorrelation lag "L" between a source frame (initially, frame 2 (612)) and a destination frame (initially, frame 3 (616)). The maximum crosscorrelation lag "L" represents the point of maximum similarity between the source frame and the destination frame. In step 716, post-processor 120 performs a synchronized crossfading procedure between the source frame and the destination frame starting at the previously-determined maximum crosscorrelation lag "L". Post-processor 120 preferably performs the synchronized crossfading procedure by decreasing the amplitude of the source frame while simultaneously increasing the amplitude of the destination frame.

Then, in step 718, post-processor 120 outputs those frames that have just completed the synchronized crossfading procedure to playback system 124 for reproduction. In step 720, post-processor 120 determines whether any unprocessed (uncrossfaded) frames of audio data remain in the variable-speed playback mode of system 110. If unprocessed frames of audio data remain in the variable-speed playback mode, then the FIG. 7 process repeatedly returns to step 712 and performs another synchronized crossfade on the next two frames of audio data until the variable-speed mode is terminated or all audio data has been processed. If, however, no unprocessed frames of audio data remain for the variable-speed mode, then the FIG. 7 process terminates.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for variable-speed playback of data, comprising:
   means for storing a source frame of said data into a memory device;
   means for storing a destination frame of said data into said memory device;
   means for performing a synchronized crossfade between said source frame and said destination frame.

2. A system for variable-speed playback of data, comprising:
   a source frame of said data located in a memory device, wherein said memory device includes a first buffer and a second buffer;
   a destination frame of said data located in said memory device;
   a processor coupled to said memory device to optimally perform a synchronized crossfade between said source frame and said destination frames, wherein said processor loads a first frame and a second frame into said first buffer, said second frame being said source frame, and wherein said processor loads a third frame and a fourth frame into said second buffer, said third frame being said destination frame.

3. The system of claim 2 wherein said processor is implemented as part of a digital video-disc device.

4. The system of claim 2 wherein said processor is implemented as part of an audio compact-disc device.

5. The system of claim 2 wherein said data includes digital audio data.

6. The system of claim 5 wherein said processor truncates said digital audio data into separate frames.

7. The system of claim 6 wherein said frames have durations of between 30 milliseconds and 50 milliseconds.

8. The system of claim 6 wherein said processor discards selections from said frames during said variable-speed playback.

9. The system of claim 2 wherein said variable-speed playback includes double-speed playback during a shuttle mode of a playback system.

10. The system of claim 2 wherein said processor analyzes said destination frame to determine crosscorrelation values between said destination frame and said source frame.

11. The system of claim 10 wherein said crosscorrelation values are proportional to relative amplitudes in said source frame and said destination frame.

12. The system of claim 10 wherein said crosscorrelation values are represented by an expression "$R_{xy}(\tau)$" which may be defined by a formula:

$$R_{xy}(\tau)=\Sigma x(k)^*y(k+\tau)\tau=0, \ldots, N/2-1$$

where x(k) is a start of said synchronized crossfade in said source frame, y(k) is a start of said destination frame, N/2 is one-half of a duration of said frames, and $\tau$ is a distance from said start of said destination frame.

13. The system of claim 12 wherein said processor analyzes said crosscorrelation values to determine a maximum crosscorrelation lag between said destination frame and said source frame.

14. The system of claim 13 wherein said maximum crosscorrelation lag is represented by an expression "L" which may be defined by a formula:

$$R_{xy}(L)=\text{Max}[R_{xy}(\tau)]\tau=0, \ldots, N/2-1.$$

15. The system of claim 13 wherein said processor performs said synchronized crossfade starting at said maximum crosscorrelation lag by decreasing a first amplitude of said source frame while simultaneously increasing a second amplitude of said destination frame.

16. The system of claim 15 wherein said processor repeatedly identifies new destination frames and new source frames, and then performs said synchronized crossfade upon said new destination frames and new source frames, while said variable-speed playback is active.

17. The system of claim 16 wherein said processor identifies a delayed starting point in said new source frames to begin said synchronized crossfade.

18. The system of claim 17 wherein said processor executes a software fader module to perform said synchronized crossfade.

19. A method for variable-speed playback of data, comprising the steps of:
   storing a source frame of data into a memory device, wherein said memory device includes a first buffer and a second buffer;
   storing a destination frame of said data into said memory device;
   performing a synchronized crossfade between said source frame and said destination frame using a processor, wherein said processor loads a first frame and a second frame into said buffer, said second frame being said source frame, and wherein said processor loads a third frame and a fourth frame into said second buffer, said third frame being said destination frame.

20. The method of claim 19 wherein said processor is implemented as part of a digital video-disc device.

21. The method of claim 7 wherein said processor is implemented as part of an audio compact-disc device.

22. The method of claim 19 wherein said data includes digital audio data.

23. The method of claim 22 wherein said processor truncates said digital audio data into separate frames.

24. The method of claim 23 wherein said frames have durations of between 30 milliseconds and 50 milliseconds.

25. The method of claim 19 wherein said variable-speed playback includes double-speed playback during a shuttle mode of a playback system.

26. The method of claim 23 wherein said processor discards selection from said frames during said variable-speed playback.

27. The method of claim 19 wherein said processor analyzes said destination frame to determine crosscorrelation values between said destination frame and said source frame.

28. The method of claim 27 wherein said crosscorrelation values are proportional to relative amplitudes in said source frame and said destination frame.

29. The method of claim 27 wherein said crosscorrelation values are represented by an expression "$R_{xy}(\tau)$" which may be defined by a formula:

$$R_{xy}(\tau)=\Sigma x(k)^{*}y(k+\tau) \tau=0,\ldots, N/2-1$$

where x(k) is a start of said synchronized crossfade in said source frame, y(k) is a start of said destination frame, N/2 is one-half of a duration of said frames, and $\tau$ is a distance from said start of said destination frame.

30. The method of claim 29 wherein said processor analyzes said crosscorrelation values to determine a maximum crosscorrelation lag between said destination frame and said source frame.

31. The method of claim 30 wherein said maximum crosscorrelation lag is represented by an expression "L" which may be defined by a formula:

$$R_{xy}(L)=\text{Max}[R_{xy}(\tau)]\tau=0,\ldots, N/2-1.$$

32. The method of claim 30 wherein said processor performs said synchronized crossfade starting at said maximum crosscorrelation lag by decreasing a first amplitude of said source frame while simultaneously increasing a second amplitude of said destination frame.

33. The method of claim 19 wherein said processor repeatedly identifies new destination frames and new source frames, and then performs said synchronized crossfade while said variable-speed playback is active.

34. The method of claim 19 wherein said processor identifies a delayed starting point in said new source frames to begin said synchronized crossfade.

35. The method of claim 19 wherein said processor executes a software fader module to perform said synchronized crossfade.

36. The method of claim 19 wherein said processor outputs said source frame and said destination frame to a playback system following said synchronized crossfade.

37. The method of claim 19 wherein said processor is a post-processor that receives decoded data from a decoder device.

38. A processor-readable medium comprising program instructions for variable-speed playback of data, by performing the steps of:

storing a source frame of said data into a memory device, wherein said memory device includes a first buffer and a second buffer;

storing a destination frame of said data into said memory device;

performing a synchronized crossfade between said source frame and said destination frame using a processor, wherein said processor loads a first frame and a second frame into said buffer, said second frame being said source frame, and wherein said processor loads a third frame and a fourth frame into said second buffer, said third frame being said destination frame.

* * * * *